(12) United States Patent
Friščić et al.

(10) Patent No.: US 11,643,426 B2
(45) Date of Patent: May 9, 2023

(54) HYPERGOLIC METAL ORGANIC FRAMEWORKS

(71) Applicant: Acsynam Inc., St-Leonard (CA)

(72) Inventors: Tomislav Friščić, Verdun (CA); Robin D. Rogers, Tuscaloosa, AL (US); Mihails Arhangelskis, Montreal (CA); Hatem Titi, Montreal (CA); Dayaker Gandrath, Montreal (CA); Joseph M. Marrett, Mendham, NJ (US)

( * ) Notice: Subject to any disclaimer, the term of this patent is extended or adjusted under 35 U.S.C. 154(b) by 636 days.

(21) Appl. No.: 16/570,307

(22) Filed: Sep. 13, 2019

(65) Prior Publication Data

US 2021/0179651 A1    Jun. 17, 2021

Related U.S. Application Data

(60) Provisional application No. 62/730,590, filed on Sep. 13, 2018.

(51) Int. Cl.
| | |
|---|---|
| *C07F 15/06* | (2006.01) |
| *C06B 43/00* | (2006.01) |
| *C07F 3/00* | (2006.01) |
| *C07F 3/06* | (2006.01) |

(52) U.S. Cl.
CPC ............ *C07F 15/065* (2013.01); *C06B 43/00* (2013.01); *C07F 3/003* (2013.01); *C07F 3/06* (2013.01)

(58) Field of Classification Search
None
See application file for complete search history.

(56) References Cited

U.S. PATENT DOCUMENTS

| | | | |
|---|---|---|---|
| 8,197,619 B1 | 6/2012 | Nelson et al. | |
| 8,257,519 B1 | 6/2012 | Nelson et al. | |
| 8,506,734 B1 | 8/2013 | Nelson et al. | |
| 2011/0319630 A1* | 12/2011 | Yaghi | C07F 3/003 |
| | | | 548/101 |
| 2017/0369387 A1 | 12/2017 | Matzger et al. | |

FOREIGN PATENT DOCUMENTS

| | | | |
|---|---|---|---|
| CN | 101434617 A | 5/2009 | |
| CN | 106883423 B | 12/2019 | |
| DE | 102010036950 | * 2/2012 | ............ C06B 43/00 |

OTHER PUBLICATIONS

DE102010036950 machine translation downloaded from Google patents on Dec. 16, 2022.*
Bushuyev et al. "Metal-Organic Frameworks (MOFs) as Safer, Structurally Reinforced Energetics", Chemistry—A European Journal, Chem. Eur. J. 2013, 19, 1706-1711, Jan. 28, 2013.
Kent et al. "Adsorption of tetranitromethane in zeolitic imidazolate frameworks yields energetic materials", Dalton Transactions 48(22), 7509-7513, Apr. 22, 2019.
Li et al. "3D Energetic Metal-Organic Frameworks: Synthesis and Properties of High Energy Materials", Angewandte Chemie International Edition 2013, 52, 14031-14035, Dec. 23, 2013.

(Continued)

*Primary Examiner* — Clinton A Brooks (57) ABSTRACT

A hypergolic metal organic framework material for producing a hypergol when combined with an oxidizer, comprising a general structure M1-L-M2, wherein L is an aromatic organic linker comprising one or more unsaturated substituents, and wherein M1 and M2 are same or different metal cations.

15 Claims, 5 Drawing Sheets

(56) References Cited

OTHER PUBLICATIONS

McDonald et al. "Coordination polymers with high energy density: an emerging class of explosives", Crystal Growth & Design, 2015, 15, 5963-5972, Nov. 9, 2015.
McDonald et al. "Rendering non-energetic microporous coordination polymers explosive", Chemical Communications 52(72), 2016, 10862-10865, Aug. 9, 2016.
Zhang et al. "A New Strategy for Storage and Transportation of Sensitive High-Energy Materials", Chemistry—A European Journal, Chem. Eur. J. 2014, 20, 7906-7910, Jun. 23, 2014.
Zhang et al. "Metal-Organic Frameworks as High Explosives: A New Concept for Energetic Materials", Angewandte Chemie International Edition 2014, 53, 2540-2542, Mar. 3, 2014.
Zhang et al. "Synthesis of Denser Energetic Metal-Organic Frameworks via a Tandem Anion-Ligand Exchange Strategy", Inorganic Chemistry, 2017, 10281-10289, Aug. 15, 2017.
Zhang et al. "Taming Dinitramide Anions within an Energetic Metal-Organic Framework: A New Strategy for Synthesis and Tunable Properties of High Energy", Chemistry of Materials 28(5), 2016, 1472-1480, Feb. 5, 2016.
Yiqiang Xu et al., High-Energy Metal-Organic Frameworks with a Dicyanamide Linker for Hypergolic Fuels. Inorganic Chemistry, 2021, 60, 7, pp. 5100-5106, Publication Date: Mar. 24, 2021.
Yiqiang Xu et al., Transition Metal Complexes Based on Hypergolic Anions for Catalysis of Ammonium Perchlorate Thermal Decomposition. Energy & Fuels, 2020, 34, 11, pp. 14667-14675; Publication Date: Sep. 28, 2020.
Yuangang Xu et al., A series of energetic metal pentazolate hydrates. Nature vol. 549, pp. 78-81(2017), Published: Aug. 28, 2017.
Djalal Trache et al., Recent advances in new oxidizers for solid rocket propulsion. Green Chemistry. 2017, 19, pp. 1711-4736.
Marcin Smiglak et al., The Second Evolution of Ionic Liquids: From Solvents and Separations to Advanced Materials—Energetic Examples from the Ionic Liquid Cookbook. Accounts of Chemical Research. 2007, 40, 11, 1182-1192, Publication Date: Nov. 3, 2007.
Amirhossein Mehrkesh et al., Energetic Ionic Materials: How Green Are They? A Comparative Life Cycle Assessment Study. ACS Sustainable Chemistry & Engineering. 2013, 1, 4, 448-455. Publication Date: Feb. 20, 2013, https://doi.org/10.1021/sc3001383.
Jonathan C. Bennion et al., Hydrogen Peroxide Solvates of 2,4,6,8,10,12-Hexanitro-2,4,6,8,10,12-hexaazaisowurtzitane. Angewandte Chemie, vol. 128, Issue42, Oct. 10, 2016, pp. 13312-13315.
Tomasz et al., Synthesis and Investigation of 2,3,5,6-Tetra-(1H-tetrazol-5-yl) pyrazine Based Energetic Materials. CHEMPLUSCHEM, vol. 83, Issue11, Nov. 2018, pp. 984-990.
Dharavath Srinivas et al., From FOX-7 to H-FOX to insensitive energetic materials with hypergolic properties. Chemical Communications, 2016, 52, pp. 7668-7671.
Stefan Schneider et al., Ionic Liquids as Hypergolic Fuels. Energy & Fuels 2008, 22, pp. 2871-2872, Publication Date: Jun. 17, 2008.
Xing Zhang et al., Synthesis and Ignition Properties Research of 1,5-Diazabicyclo[3.1.0]Hexane Type Compounds as Potential Green Hypergolic Propellants. Industrial & Engineering Chemistry Research. 2017, 56, 11, pp. 2883-2888, Publication Date: Feb. 26, 2017.
Jesse J. Sabatini et al., Recent Advances in the Synthesis of High Explosive Materials. Crystals 2016, 6(1), 5; https://doi.org/10.3390/cryst6010005, Published: Dec. 29, 2015.
Hiroumi Tani et al., Hypergolic ignition and flame structures of hydrazine/nitrogen tetroxide co-flowing plane jets. Proceedings of the Combustion Institute vol. 35, Issue 2, 2015, pp. 2199-2206.
Parker D. McCrary et al., Evaluating Ionic Liquids as Hypergolic Fuels: Exploring Reactivity from Molecular Structure. Energy & Fuels, 2014, 28, 5, 3460-3473, Publication Date:Mar. 21, 2014.
Qinghua Zhang et al., Energetic Ionic Liquids as Explosives and Propellant Fuels: A New Journey of Ionic Liquid Chemistry. Chemical Reviews, 2014, 114, 20, 10527-10574, Publication Date:Sep. 10, 2014.
Songqing Li et al., Borohydride Ionic Liquids and Borane/Ionic-Liquid Solutions as Hypergolic Fuels with Superior Low Ignition-Delay Times. vol. 126, Issue11 Mar. 10, 2014,pp. 3013-3016.
Patricia Silva et al., Multifunctional metal-organic frameworks: from academia to industrial applications. Chemical Society Reviews, 2015, 44, 6774-6803.
Hiroyasu Furukawa et al., The Chemistry and Applications of Metal-Organic Frameworks. Science, vol. 341, Issue 6149, Aug. 30, 2013.
Kyle A. McDonald et al., Coordination Polymers with High Energy Density: An Emerging Class of Explosives. Crystal Growth & Design, 2015, 15, 12, 5963-5972, Publication Date: Nov. 9, 2015.
Yinli Zhang et al., A solvent-free dense energetic metal-organic framework (EMOF): to improve stability and energetic performance via in situ microcalorimetry Chemical Communications, 2017, 53, 3034-3037.
Sheng Zhang et al., High-energy metal-organic frameworks (HE-MOFs): Synthesis, structure and energetic performance. Coordination Chemistry Reviews. vol. 307, Part 2, Jan. 15, 2016, pp. 292-312.
L. H. Blair et al., Metal-organic fireworks: MOFs as integrated structural scaffolds for pyrotechnic materials. Chemical Communications, 2015,51, 12185-12188.
Kyo Sung Park et al., Exceptional chemical and thermal stability of zeolitic imidazolate frameworks. PNAS Jul. 5, 2006 103 (27) 10186-10191; first published Jun. 23, 2006.
Jie-Peng Zhang et al., Metal Azolate Frameworks: From Crystal Engineering to Functional Materials. Chemical Reviews, 2012, 112, 2, 1001-1033, Publication Date: Sep. 22, 2011.
Patrick J. Beldon et al., Rapid Room-Temperature Synthesis of Zeolitic Imidazolate Frameworks by Using Mechanochemistry. Angewandte Chemie, vol. 122, Issue50, Dec. 10, 2010, pp. 9834-9837.
Julien Cousin Saint Remi et al., Biobutanol Separation with the Metal-Organic Framework ZIF-8. CHEMSUSCHEM, vol. 4, Issue 8, Aug. 22, 2011, pp. 1074-1077.
Joseph M. Marrett et al., Supercritical Carbon Dioxide Enables Rapid, Clean, and Scalable Conversion of a Metal Oxide into Zeolitic Metal—Organic Frameworks. Crystal Growth & Design, 2018, 18, 3222-3228, Publication Date: Mar. 14, 2018.
Giovanni P. Rachiero et al., Versatility and remarkable hypergolicity of exo-6, exo-9 imidazole-substituted nido-deca borane. Chemical Communications, 2017, 53, 7736-7739.
Weihua Zhu et al., First-principles band gap criterion for impact sensitivity of energetic crystals: a review. Structural Chemistry vol. 21, pp. 657-665(2010), Published: Feb. 12, 2010.
Zhaoyang Zheng et al., Structural, electronic and elastic properties of several metal organic frameworks as a new kind of energetic materials Chemical Physics Letters, vol. 628, May 16, 2015, pp. 76-80.
Saona Seth et al., Metal Effects on the Sensitivity of Isostructural Metal-Organic Frameworks Based on 5-Amino-3-nitro-1H-1,2,4-triazole. Inorganic Chemistry, 2017, 56, 17, 10151-10154, Publication Date: Aug. 24, 2017.
Qi Sun et al., Imparting amphiphobicity on single-crystalline porous materials. Nature Communications vol. 7, Article No. 13300 (2016), Published: Oct. 31, 2016.

* cited by examiner

HYPERGOLIC METAL ORGANIC FRAMEWORKS

The present application claims priority from the earlier filed U.S. provisional patent application No. 62/730,590 filed on Sep. 13, 2018.

TECHNICAL FIELD

The present disclosure relates to hypergols, and more particularly to hypergolic metal organic frameworks for producing hypergols.

BACKGROUND

Energetic materials, i.e., controllable chemical energy storage systems, are central for a number of civilian applications. Current research in this area is aimed towards materials with specific requirements, such as high energy density, improved thermal stability, low cost, and environmental acceptability. An important class of energetic materials are hypergolic materials, fuels which ignite in contact with an oxidizer, such as white (WFNA) or red fuming nitric acid (RFNA) (for producing, e.g. propellants, pyrotechnics and explosives). Hypergolic compounds are ubiquitous in spacecraft and launcher propellant systems, requiring materials with a low ignition delay (ID), defined as the time between ignition and the first contact of the fuel with the oxidizer. The most popular hypergolic components of bipropellant systems today are based on toxic and highly carcinogenic hydrazine and its derivatives, rising concerns of environmental damage. The annual release of cancerogenic propellants in the atmosphere is estimated at 12,000 tons for Europe alone, inspiring the search for safer hypergolic fuels.

Metal-organic frameworks (MOFs) are microporous materials of importance in gas separation and storage, catalysis, and have been also been explored as energetic materials. However, the exploration of MOFs and non-porous coordination polymers as energetic materials has so far focused on energetic metal organic frameworks, rather than hypergolic metal organic frameworks that can be used as, e.g., hypergolic fuels.

It would therefore be advantageous to develop a metal organic framework that produces a hypergol when combined with an oxidizer, i.e., that ignites when combined with an oxidizer.

SUMMARY

The present disclosure relates to a hypergolic metal organic framework that can be used to produce a hypergol when combined with an oxidizer. As such, the hypergolic metal organic framework ignites after contact with the oxidizer.

The hypergolic metal organic framework can therefore be used as a fuel (a material used to produce heat and/or power) for producing a hypergolic mixture, such as a hypergolic propellant or hypergolic explosive.

The hypergolic metal organic framework has a structure of metal cations coordinated to aromatic organic ligands. The aromatic organic ligand is substituted with one or more unsaturated groups (a substituent having one or more double bonds and/or one or more triple bonds). As such, the combination of the aromatic organic ligand, having the unsaturated substituent, with the metal cations provides a hypergolic metal organic framework that can produce a hypergol (that ignites) after combining with an oxidizer.

A broad aspect is a hypergolic metal organic framework material for producing a hypergol when combined with an oxidizer, comprising a general structure M1-L-M2, wherein L is an aromatic organic linker comprising one or more unsaturated substituents, and wherein M1 and M2 are same or different metal cations.

In some embodiments, M1 and M2 may each be divalent metal cations.

In some embodiments, M1 and M2 may be each selected from: $Co^{2+}$, $Zn^{2+}$ $Cd^{2+}$, $Fe^{2+}$, $Ni^{2+}$ and $Cu^{2+}$.

In some embodiments, M1 and M2 may each be $Co^{2+}$.

In some embodiments, M1 and M2 may each be $Zn^{2+}$.

In some embodiments, M1 and M2 may each be $Cd^{2+}$.

In some embodiments, the unsaturated substituent may include a double bond.

In some embodiments, the double bond may be terminal.

In some embodiments, the unsaturated substituent may include a triple bond.

In some embodiments, the triple bond may be terminal.

In some embodiments, the substituent may have a double bond or triple bond between a first atom of the substituent that is bonded to the aromatic organic linker and a second atom of the substituent that is bonded to the first atom of the substituent.

In some embodiments, the substituent may have a double bond between the first atom of the substituent that is bonded to the aromatic organic linker and the second atom of the substituent that is bonded to the first atom of the substituent.

In some embodiments, the substituent may be a vinyl group.

In some embodiments, the substituent may have a triple bond between the first atom of the substituent that is bonded to the aromatic organic linker and the second atom of the substituent that is bonded to the first atom of the substituent.

In some embodiments, the substituent may be an ethynyl group.

In some embodiments, the aromatic organic linker may be an azolate linking moiety.

In some embodiments, the azolate linking moiety may be selected from pyrazolate, imidazolate, 1,2,4-triazolate, 1,2,3-triazolate, tetrazolate or a combination thereof.

In some embodiments, the azolate linking moiety may be imidazolate.

In some embodiments, one of the one or more unsaturated substituents may be located at a 2-position of the imidazolate.

In some embodiments, the aromatic organic linker may be a conjugate base derived from:

-continued or a combination thereof.

In some embodiments, the metal organic framework material may exhibit an ignition delay of 50 ms or less in contact with red fuming nitric acid.

In some embodiments, the metal organic framework material may exhibit an ignition delay of 2 ms or less in contact with white fuming nitric acid.

Another broad aspect is use of a hypergolic metal organic framework material as defined herein for producing a hypergol when the hypergolic metal organic framework material is combined with an oxidizer, wherein an ignition occurs by combining the hypergolic organic framework material with the oxidizer.

Another broad aspect is a hypergol including hypergolic metal organic framework material as defined herein; and an oxidizer, wherein an ignition occurs by combining the hypergolic organic framework material with the oxidizer.

In some embodiments, the oxidizer may be composed of 70% to 100% by weight of nitric acid.

In some embodiments, the oxidizer may be one of red fuming nitric acid and white fuming nitric acid.

Another broad aspect is a composition for yielding a hypergol including hypergolic metal organic framework material as defined herein; and an oxidizer, wherein an ignition occurs by combining the hypergolic organic framework material with the oxidizer.

In some embodiments, the oxidizer may be composed of 70% to 100% by weight of nitric acid.

In some embodiments, the oxidizer may be one of red fuming nitric acid and white fuming nitric acid.

Another broad aspect is a method of producing a hypergol. The method includes combining a hypergolic metal organic framework material as defined in any one of claims 1 to 22 with an oxidizer, wherein an ignition occurs by combining the hypergolic organic framework material with the oxidizer.

In some embodiments, the oxidizer may be composed of 70% to 100% by weight of nitric acid.

In some embodiments, the oxidizer may be one of red fuming nitric acid and white fuming nitric acid.

Another broad aspect is a hypergolic metal organic framework material comprising a general structure M1-L-M2, wherein L is an imidazolate linking moiety comprising a substituent at the 2 position, wherein the substituent is one of vinyl and ethynyl, wherein M1 and M2 are the same or different transition metal cations, and wherein each of M1 and M2 are selected from $Co^{2+}$ and $Cd^{2+}$.

In some embodiments, a substituent at a 4-position of the imidazolate linking moiety may be selected from one of: H, loweralkyl, oxyalkyl, cycloalkyl, aryl, heteroaryl, heterocycloalkyl, aminoalkyl and a halogen.

In some embodiments, a substituent at a 5-position of the imidazolate linking moiety is selected from one of: H, loweralkyl, oxyalkyl, cycloalkyl, aryl, heteroaryl, heterocycloalkyl, aminoalkyl and a halogen.

In some embodiments, each of M1 and M2 may be $Co^{2+}$.

In some embodiments, each of M1 and M2 may be $Cd^{2+}$.

In some embodiments, the substituent at the 2-position may be vinyl.

In some embodiments, the substituent at the 2-position may be ethynyl.

Another broad aspect is a hypergolic metal organic framework material comprising a general structure M1-L-M2, wherein L is an imidazolate linking moiety comprising a substituent at the 2 position, wherein the substituent is ethynyl, wherein M1 and M2 are the same or different transition metal cations, and wherein each of M1 and M2 are selected from $Zn^{2+}$.

In some embodiments, a substituent at a 4-position of the imidazolate linking moiety may be selected from one of: H, loweralkyl, oxyalkyl, cycloalkyl, aryl, heteroaryl, heterocycloalkyl, aminoalkyl and a halogen.

In some embodiments, a substituent at a 5-position of the imidazolate linking moiety may be selected from one of: H, loweralkyl, oxyalkyl, cycloalkyl, aryl, heteroaryl, heterocycloalkyl, aminoalkyl and a halogen.

In some embodiments, the hypergolic metal organic framework as defined herein may be used as a fuel.

In some embodiments, the hypergolic metal organic framework combined with an oxidizer may be used as a hypergolic propellant.

In some embodiments, the hypergolic metal organic framework combined with an oxidizer may be used as a hypergolic explosion.

In some embodiments, the hypergolic metal organic framework combined with an oxidizer may be used as a hypergolic pyrotechnic.

In some embodiments, the hypergolic metal organic framework may include nitric acid, liquid oxygen and/or hydrogen peroxide.

Another broad aspect is a combustible composition comprising a hypergolic metal-organic framework material, a combustible substance and an additive, wherein the hypergolic metal organic framework material is for producing a hypergol when combined with an oxidizer, the hypergolic metal organic framework material comprising a general structure M1-L-M2, wherein L is and aromatic linker comprising one or more unsaturated substituents, and wherein M1 and M2 are same or different metal cations.

In some embodiments, the general structure of the hypergolic metal-organic framework may be selected from: Zn(VIm2), Co(VIm2), Cd(VIm2), Zn(AIm2), Co(AIm2), or Cd(AIm2).

In some embodiments, the combustible substance may be a metal or metalloid powder.

In some embodiments, the combustible substance may be a metal or metalloid powder selected from at least one of Al(0), Mg(0), Zn(0), Zr(0), Ti(0), W(0) and Si(0).

In some embodiments, the combustible substance may be an inorganic compound.

In some embodiments, the combustible substance may be an inorganic compound selected from at least one of the groups consisting of boranes, decaborate anions, hydrides, sulfides, hydrazine, hydrazine derivatives, inorganic salts, or peroxides.

In some embodiments, the combustible substance may be an inorganic compound selected from decaborane, hydrazine and aluminum hydride.

In some embodiments, the combustible substance may be an organic compound.

In some embodiments, the combustible substance may be an organic compound with at least one functional group selected from cyano, nitro, amino, alkyl, allyl, alkynyl, butadienyl, phenyl, halides, hydroxyl, carbonyl, peroxy, acetylene, ethylene and vinyl.

In some embodiments, the combustible substance may be an organic compound selected from paraffin, kerosene and nitroglycerin.

In some embodiments, the combustible substance may be a polymeric compound.

In some embodiments, the combustible substance may be an organic polymeric compound selected from one or more groups consisting of polyesters, polysulfides, polyurethanes, resins, nitrates and rubbers.

In some embodiments, the combustible substance may be a polymeric compound selected from hydroxylterminated polybutadiene, polyethylene, polystyrene and polybutadiene acrylonitrile.

In some embodiments, the additive may serve as a catalyst or initiator.

In some embodiments, the additive may include one or more metals.

In some embodiments, the additive may include one or more metals selected from at least one of Ti(0), Al(0), Pd(0) and Zr(0).

In some embodiments, the additive may be an inorganic compound.

In some embodiments, the additive may include one or more inorganic compounds selected from hydrides, azides, cyanamides, nitrates, acetates, sulfates, perchlorates, peroxides, oxides and picrates.

In some embodiments, the additive may be an inorganic compound selected from ammonium nitrate, ammonium perchlorate and aluminum borohydride.

In some embodiments, the additive may be the oxidizer.

In some embodiments, the hypergolic metal-organic framework may be present in an amount of 1% to 99% by weight.

In some embodiments, the combustible substance may be present in an amount of 1% to 99% by weight.

In some embodiments, the additive may be present in an amount of 1% to 99% by weight.

Another broad aspect is a combustible material comprising a hypergolic metal-organic framework material for producing a hypergol when combined with an oxidizer, comprising a general structure M1-L-M2, wherein L is an aromatic linker comprising one or more unsaturated substituents, and wherein M1 and M2 are same or different metal cations, wherein the metal-organic framework includes pores containing one or more guests.

In some embodiments, the hypergolic metal-organic framework may be selected from: Zn(VIm2), Co(VIm2), Cd(VIm2), Zn(AIm2), Co(AIm2) and Cd(AIm2).

In some embodiments, the guest may be a metal or metalloid powder.

In some embodiments, the guest may be a metal or metalloid powder selected from at least one of Al(0), Mg(0), Zn(0), Zr(0) and Si(0).

In some embodiments, the guest may be an inorganic compound.

In some embodiments, the guest may be an inorganic compound selected from one or more groups consisting of hydrides, azides, cyanamides, nitrates, acetates, sulfates, perchlorates, peroxides, oxides and picrates.

In some embodiments, the additive may be an inorganic compound such as ammonium nitrate, ammonium perchlorate, or aluminum borohydride.

In some embodiments, the guest may be an organic compound.

In some embodiments, the guest may be an organic compound with at least one functional group selected cyano, nitro, amino, alkyl, allyl, alkynyl, phenyl, halides, hydroxyl, carbonyl, peroxy and acetylene.

In some embodiments, the guest may be an organic compound is selected from paraffin, kerosene and nitroglycerin.

In some embodiments, the guest may be present in the metal-organic framework with a molar ratio anywhere from 0.1:0.9 to 0.9:0.1.

In some embodiments, the guest may be an additive or a combustible substance.

Another broad aspect is a combustible composition comprising a hypergolic metal-organic framework material, and further comprising a combustible substance and/or an additive, wherein the hypergolic metal organic framework material is for producing a hypergol when combined with an oxidizer, the hypergolic metal organic framework material comprising a general structure M1-L-M2, wherein L is and aromatic linker comprising one or more unsaturated substituents, and wherein M1 and M2 are same or different metal cations.

Another broad aspect is a method of producing a combustible composition, the method including adding a combustible substance and/or an additive to a hypergolic metal-organic framework material, wherein the hypergolic metal organic framework material is for producing a hypergol when combined with an oxidizer, the hypergolic metal organic framework material comprising a general structure M1-L-M2, wherein L is and aromatic linker comprising one or more unsaturated substituents, and wherein M1 and M2 are same or different metal cations.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to hypergolic metal organic frameworks which ignite when the hypergolic metal organic framework is combined with an oxidizer. The hypergolic reaction is carried out without there needing to be any additives or compounds other than the hypergolic metal organic framework and the oxidizer. However, it will be understood that additives may be added to the mixture of the hypergolic metal organic framework and the oxidizer without departing from the present teachings.

As such, the hypergolic metal organic frameworks of the present disclosure can be distinguished from energetic metal organic frameworks, where an additional component, aside from the metal organic framework and the oxidizer, may be required to cause ignition. The hypergolic metal organic framework ignites upon contact of the oxidizer, without the need for any additional agent.

Metal organic frameworks include, but are not limited to, zeolitic imidazolate frameworks, metal azolate frameworks, and carboxylate-based frameworks, etc., etc.

The hypergolic metal organic framework has a structure where metal cations are coordinated to aromatic organic linkers, the aromatic organic linker including one or more unsaturated substituents (having one or more double bonds and/or one or more triple bonds).

Preferably, the hypergolic metal framework has an ignition time equal to or under 50 ms when combined with the oxidizer. In some other embodiments, the hypergolic metal framework has an ignition time equal or under 5 ms, or equal or under 2 ms, when combined with the oxidizer. For instance, an ignition time equal to or under 10 ms occurs when the substituent is an ethynyl group or has a triple bond between the first atom of the substituent that is bonded to the aromatic organic linker and the second atom of the substituent that it bonded to the first atom of the substituent (however other substituents may be used in order to achieve an ignition time equal to or under 10 ms).

In some embodiments, the metal cations of the metal organic framework are divalent metal cations. Exemplary divalent metal cations include, but are not limited to, $Co^{2+}$, $Zn^{2+}$ and $Cd^{2+}$.

In some embodiments, the unsaturated substituent may have a terminal double bond. In some embodiments, the unsaturated substituent may have a terminal triple bond.

In some embodiments, the unsaturated substituent may have a double bond between the first atom of the substituent that is bonded to the aromatic organic linker and the second atom of the substituent that it bonded to the first atom of the substituent.

In some embodiments, the unsaturated substituent may be a vinyl group. In some embodiments, the unsaturated substituent may be an ethynyl group. However, the unsaturated substituent may be another substituent (e.g. any linear aliphatic chain containing one or more double or triple bonds) without departing from the present teachings.

In some embodiments, the aromatic organic linker may be an azolate linking moiety.

In some embodiments, the azolate linking moiety may be an imidazolate. In some embodiments, the unsaturated substituent may be present at the 2-position of the imidazolate. In some examples, the imidazolate may have an unsaturated substituent at the 4-position and/or the 5-position.

The hypergolic metal organic framework may be used as a fuel that, when combined with an oxidizer, produces a hypergolic propellant. It will be understood that the hypergolic metal organic framework may be for other uses than that of a fuel. It will also be understood that the hypergol resulting from the combination of the hypergolic metal organic framework and the oxidizer may be for other uses than that of a hypergolic propellant.

Uses of the hypergolic metal organic framework, once combined with an oxidizer, may include, hypergolic propellants, hypergolic explosives, hypergolic pyrotechnics, etc.

In the present disclosure, by "hypergol", because a hypergol undergoes a reaction once its constituents are combined, it will be understood that it includes, in some examples, the combined constituents (the hypergolic metal organic framework and the oxidizer), and in some examples, the separate substituents such that they may be combined at the appropriate time when the use of the hypergol is required.

The constituents of the hypergol may be stored and/or transported in use-appropriate vehicles (e.g. a vehicle or compartment that prevents air exposure).

In some examples, the hypergolic metal organic framework may be provided and/or stored in a medium that reduces or eliminates its exposure to external elements (e.g. a gaseous medium such as inert atmosphere, $N_2$; atmospheric gases; a liquid medium such as ethanol, methanol, dimethylformamide, acetone, tetrahydrofuran, etc). The hypergolic metal organic framework may be removed from the medium prior to use.

In some embodiments, the method of producing a hypergol results in adding the oxidizer to the hypergolic metal organic framework. It will be understood that the conditions of the combining and the environment in which the combining takes place may need to be controlled for safety and/or depending on the use of the hypergol.

Exemplary hypergolic metal organic framework structures are as follows:

Exemplary Synthesis

An exemplary synthesis is as follows:

ZnO (1 mmol), ethynyl/vinyl imidazole (2 mmol, 2.1 mmol for VIm), ammonium acetate (0.12 mmol, catalytic salt), and 100 μL dry EtOH were added to a 15 mL stainless-steel milling jar with two stainless-steel milling balls (1.34 g/7 mm each) The mixture was milled for 30 minutes at frequency of 30 Hz in a shaker-mill (Retsch MM400, Germany) to yield a microcrystalline product. The product was added to 15 mL of methanol, stirred overnight, then vacuum filtered. The dry product was then evacuated overnight under vacuum at 80° C.

In case of Co-MOF, CoCO3 was used, and for Cd-MOFs, CdO was used.

Another exemplary synthesis is as follows:

For producing, e.g., SOD-Zn(AIm)$_2$:

A mixture of 2 mmol HAIm and 2 mmol triethylamine was added to 15 mL DMF and stirred at room temperature. A solution of 1 mmol zinc nitrate hexahydrate in 5 mL DMF was added dropwise, over 30 seconds, to the stirred solution of HAIm and triethylamine causing the the precipitation of the target framework. This mixture was capped and placed at 60° C. for 3 hours, the product isolated by filtration, and suspended in 20 mL methanol. This suspension was placed, capped, at 60° C. overnight, the product was again filtered, and stirred in chloroform for 3 hours to remove any residual DMF. Finally, the framework was isolated by filtration and evacuated at 80° C. under vacuum overnight to afford the pure product.

Definitions

The term a "hypergolic metal organic framework" or "hypergolic metal organic framework material" as used herein refers to a metal organic framework material (e.g. in solid form) that ignites upon contact with an oxidizer and without external aid (such as a spark). The metal organic framework has metal ions coordinated to organic linkers or ligands to form one-, two- or three-dimensional structures.

The term "hypergol" as used herein refers to a substance or composition that ignites without external aid upon contact of its components. For instance, a hypergol may be a hypergolic propellant, a hypergolic explosive, a hypergolic pyrotechnic material, etc.

The term "additive" as used herein refers to a substance that either accelerates the reaction, initiates the reaction or enhances the combustion of the reaction. For instance, an additive can be a catalyst or an initiator. Exemplary additives may include hydrides, azides, cyanamides, nitrates, acetates, sulfates, perchlorates, peroxides, oxides and picrates.

The term "pore" is used herein to define a space or pocket created by the structure of the hypergolic metal organic framework.

The term "guest" as used herein refers to a substance present in or enclosed by the pore(s) of the hypergolic metal organic framework.

The term "combustible substance" as used herein refers to a substance that can be added to a composition including the hypergolic metal organic framework that can undergo combustion with the hypergolic metal organic framework.

The term an "oxidizer", "oxidant" or "oxidizing agent" as used herein refers to a substance that is able to oxidize other substances, causing them to lose electrons. Exemplary oxidizers include, but are not limited to, peroxides (such as hydrogen peroxide), nitric acid, nitrate compounds, sulfuric acid, halogen compounds, sodium perborate, hexavalent chromium compounds, peroxydisulfuric acid, peroxymonosulfuric acid, chlorite, chlorate, perchlorate, oxygen (such as liquid oxygen), ozone, etc.

The term "aromatic organic linker" as used herein refers to an aromatic organic molecule that are coordinated with metal cations to form metal organic frameworks. Exemplary aromatic organic linkers include, but are not limited to azolates, terephthalates, trimesates, benzoates, mellitates.

The term "aminoalkyl" as used herein refers to a C1-C6 linear or branched alkyl joined to an amino group (NH$_2$). Examples of aminoalkyl include, but are not limited to, —CH$_2$NH$_2$, —CH$_2$CH$_2$NH$_2$, etc. An aminoalkyl may be optionally substituted with one to five substituents independently selected from, for instance, the group consisting of hydroxy, thiol, cyano, nitro, loweralkyl, sulfonyl, halogen or amino.

The term "aryl" as used herein refers to a six to ten membered monocyclic or polycyclic aromatic ring where all of the ring atoms are carbon atoms. Examples of aryls include but are not limited to phenyl and biphenyl. An aryl may be optionally substituted with one to five substituents independently selected from, for instance, the group consisting of hydroxy, thiol, cyano, nitro, loweralkyl, sulfonyl, halogen or amino.

The term "cycloalkyl" as used herein, refers to a three to ten membered monocyclic or polycyclic ring, saturated or partially unsaturated, where all of the ring atoms are carbon. Examples of cycloalkyl include, but are not limited to, cyclopropyl, cyclobutyl, cyclopentyl, cyclopentenyl, cyclohexyl, cyclohexenyl, etc. A cycloalkyl may be optionally substituted by one to five substituents independently selected from, for instance, the group consisting of hydroxy, thiol, cyano, nitro, loweralkyl, sulfonyl, halogen or amino.

The term "heteroaryl" as used herein refers to a five to ten membered monocyclic or polycyclic aromatic ring having atoms selected from N, O, S and C. Examples of heteroaryl include, but are not limited to, furanyl, thienyl, imidazolyl, pyrazolyl, pyrrolyl, pyrrolinyl, thiazolyl, etc. An heteroaryl may be optionally substituted with one to five substituents independently selected from, for instance, the group consisting of hydroxy, thiol, cyano, nitro, loweralkyl, sulfonyl, halogen or amino.

The term "heterocycloalkyl" as used herein refers to a four to ten membered monocyclic or polycyclic ring, saturated or partially unsaturated, where the ring atoms are selected from N, O, S and C. Examples of heterocycloalkyl include, but are not limited to, azetidinyl, tetrahydrofuran, dihydrofuran, dioxane, morpholine, etc. A heterocycloalkyl may be optionally substituted by one to five substituents independently selected from, for instance, the group consisting of hydroxy, thiol, cyano, nitro, loweralkyl, sulfonyl, halogen or amino.

The term "loweralkoxy" or "oxyalkyl" as used herein, refers to C1-C6 linear or branched alkoxy, such as methoxy, ethoxy, propyloxy, butyloxy, isopropyloxy, and t-butyloxy. A loweralkoxy or oxyalkyl may be optionally substituted with one to five substituents independently selected from, for instance, the group consisting of hydroxy, thiol, cyano, nitro, loweralkyl, sulfonyl, halogen or amino.

The term "loweralkyl," as used herein, refers to C1-C6 linear or branched alkyl, such as methyl, ethyl, propyl, butyl, isobutyl, isopropyl, sec-butyl, tert-butyl, pentyl, isopentyl, and hexyl. A loweralkyl may be optionally substituted with one to five substituents independently selected from, for instance, the group consisting of hydroxy, thiol, cyano, nitro, loweralkyl, sulfonyl, halogen or amino.

Exemplary Study 1:

The following study provides non-limitative examples of hypergolic metal organic frameworks of the present disclosure.

A MOF design for hypergolic solids is now presented, based on introducing acetylene and vinyl triggers into zeolitic imidazolate frameworks (ZIFs): metal-organic structures in which zeolite-like topologies are achieved by combining tetrahedrally-coordinated metal nodes with imidazolates as bent linkers. The proposed design is inspired by the ZIF structure, consisting of imidazolate linkers flanked by cationic nodes, resembling the general structure of imidazolium ions used in the design of hypergolic ionic liquids. Based on this analogy, it was speculated that introducing unsaturated functionalities, known to trigger hypergolicity in liquid fuels, into the imidazolate linker structure should produce open ZIFs that are ignitable, with hypergolic behavior tunable by choice of metal nodes and substituents on the imidazolate linker.

Figure 1:
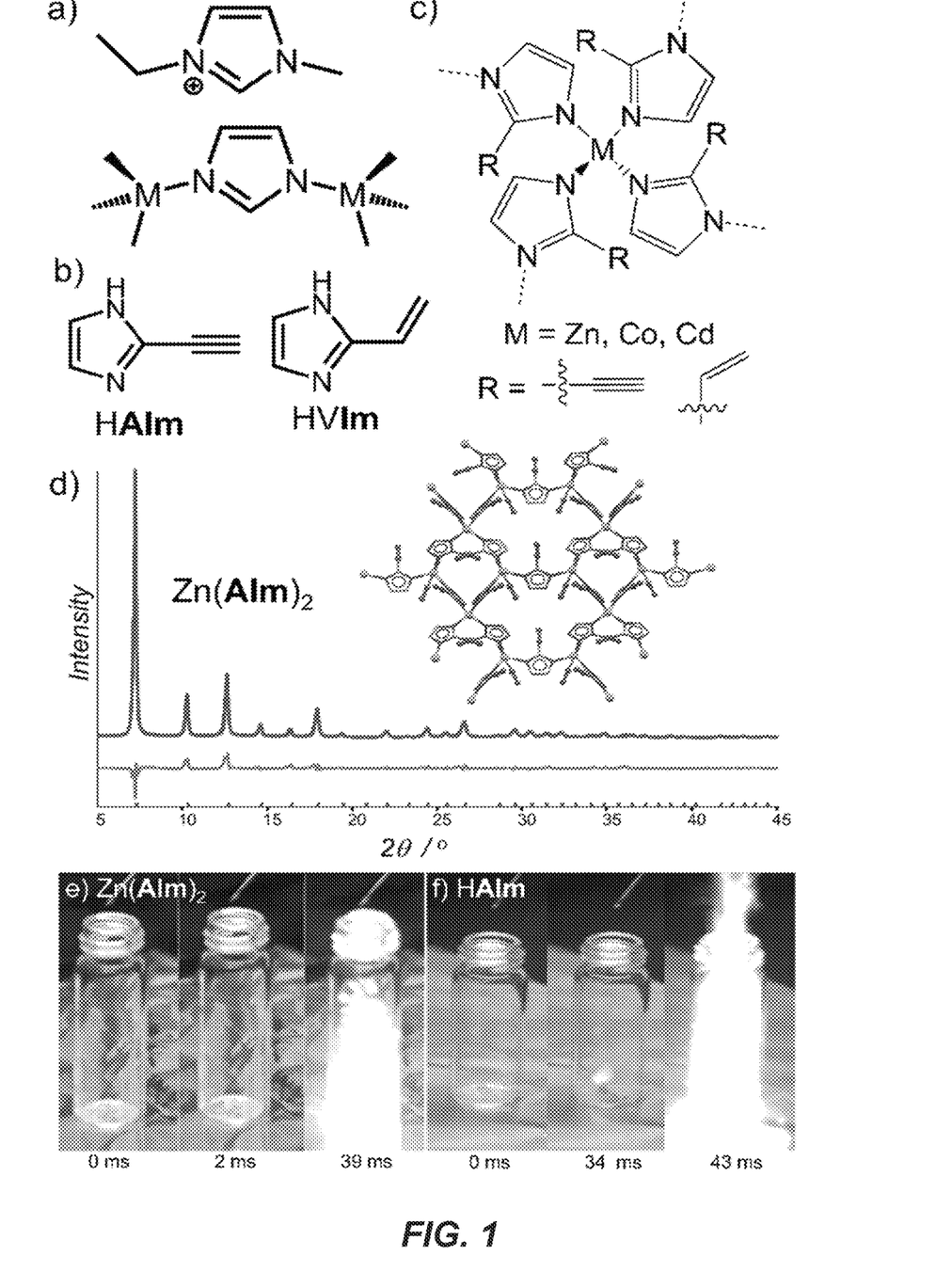
FIG. 1 shows schematic representations of: (a) HAIm and HVIm hypergolic ZIF precursors and (b) fragment of a hypergolic ZIF structure. (c) The final Rietveld fit for the structure of $Zn(AIm)_2$ with a fragment of the crystal structure shown.

The first hypergolic ZIF was prepared mechanochemically, following a previously described ion- and liquid-assisted grinding (ILAG) procedure, by ball milling of ZnO with 2-ethynylimidazole (HAlm) in a 1:2 stoichiometric ratio (FIG. 1). Powder X-ray diffraction (PXRD) indicated the crude product was isostructural to ZIF-8 (CSD OFERUN02), a sodalite (SOD) topology ZIF based on 2-methylimidazole (HMeIm), allowing us to create a preliminary structural model by replacing the methyl substituents of ZIF-8 with alkyne groups. After the product was washed with MeOH and evacuated, this structure was readily refined against experimental PXRD data using the Rietveld method. Thermogravimetric analysis (TGA) in air of the washed and evacuated material was consistent with the formula $Zn(Alm)_2$, and the presence of alkyne groups was evident from infrared spectroscopy (IR) by a characteristic C—H stretching band at 3330 $cm^{-1}$ and a weak triple bond stretch at 2129 $cm^{-1}$.

Figure 2:
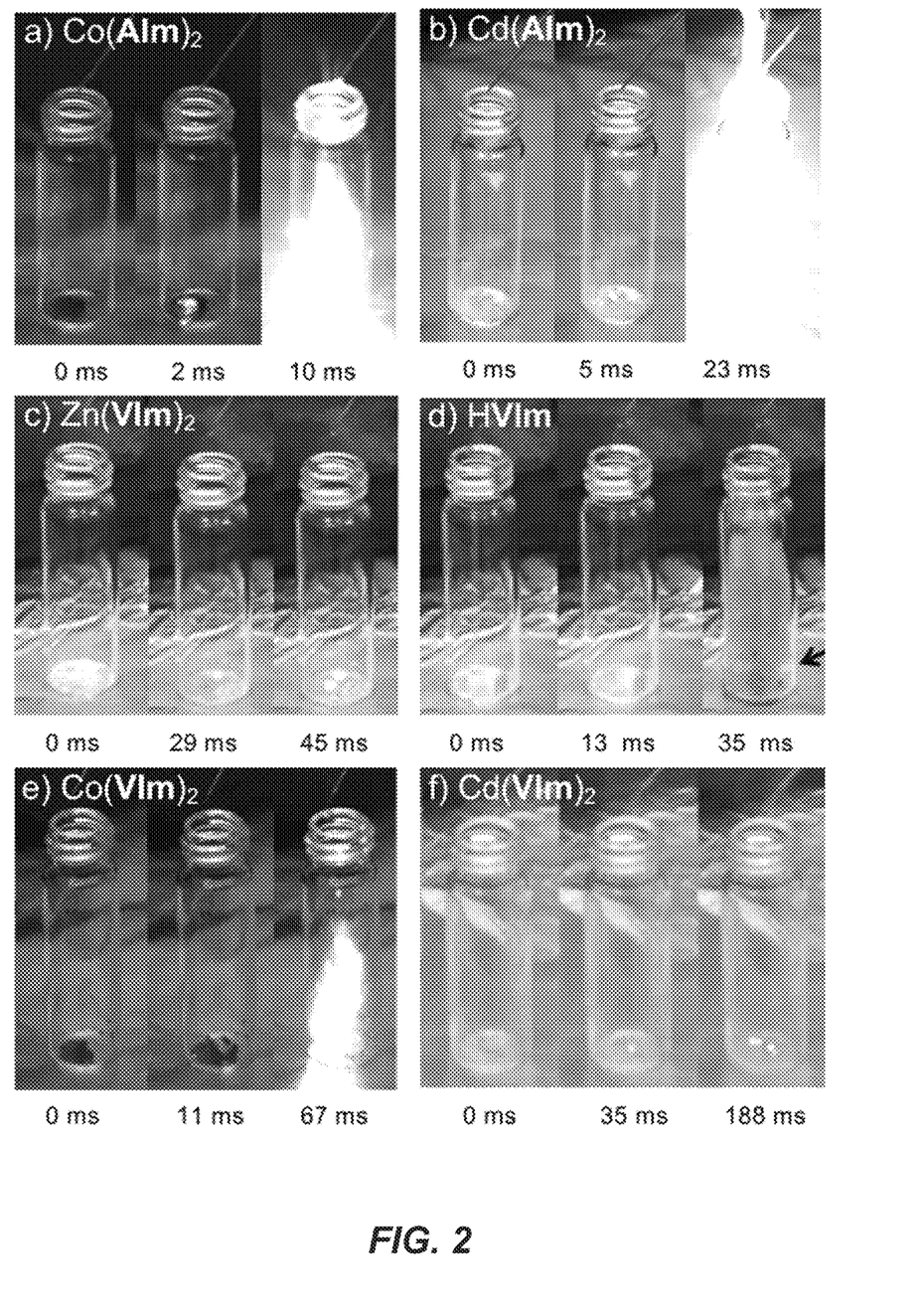
FIG. 2 is a set of photographs of examples of hypergolicity drop tests for: (a) $Zn(AIm)_2$; (b) $Co(AIm)_2$; (c) $Cd(AIm)_2$; (d) $Zn(VIm)_2$; (e) $Co(VIm)_2$, and (f) $Cd(VIm)_2$. Each test was done in triplicate.

The ID for $Zn(Alm)_2$ was evaluated by a standard drop test (FIG. 2a) in which a 100 μL Hamilton micro-syringe was used to release a single 10 μL drop of WFNA from a fixed height of 5 cm into a 4.5 cm high glass vial containing 5.0 mg of $Zn(Alm)_2$ concentrated in the center of the vial. Each measurement was repeated three times and recorded using a Redlake MotionPro Y4 high-speed camera, operating at 1000 frames/s in monochrome. The drop tests revealed an extremely short ID of 2(1) ms for $Zn(Alm)_2$, with appearance of both red and blue flames, reaching a height of ca. 4 cm, and lasting for more than 600 ms. Importantly, the ID of $Zn(Alm)_2$ remained the same for mechanochemically and solution-prepared material. Hypergolic behavior was also observed for solid HAlm, but with a much longer ID of 34(4) ms and red flames indicating that ZIF formation enhances the hypergolic behavior of the solid ligand. This observation highlights a significant difference between the presented hypergolic MOF design, in which framework formation enhances ligand hypergolicity, and approaches to energetic MOFs, where the formation of coordination bonds leads to stabilization of an energetic ligand.

To verify the importance of the acetylene trigger for hypergolicity of $Zn(Alm)_2$, drop tests were conducted on two ZIFs containing saturated hydrocarbon groups: the open RHO-topology framework based on 2-ethylimidazole (HEtIm) and ZIF-8. The RHO—$Zn(EtIm)_2$ framework was chosen as the direct saturated analogue of $Zn(Alm)_2$, while ZIF-8 was chosen due to isostructurality to $Zn(Alm)_2$. No hypergolic behavior was observed for either RHO—Zn (EtIm)$_2$ or ZIF-8, indicating that the trigger substituent is indeed responsible for hypergolic behavior.

TABLE 1

Hypergolic properties of ZIFs in WFNA drop tests.[a]

| ZIF | ID (ms) | flame duration (s) | flame height[b] (cm) | flame color |
|---|---|---|---|---|
| $Zn(Alm)_2$ | 2(1)[c], 2(1)[d] | >600 | 4 | red, blue |
| $Co(Alm)_2$ | 2(1) | >200 | 4 | orange |
| $Cd(Alm)_2$ | 5(1)[c], 2(2)[d] | >200 | 6 | yellow |
| $Zn(VIm)_2$ | 29(1) | Sparks | Sparks | red |
| $Co(VIm)_2$ | 11(5) | >200 | 2 | orange |
| $Cd(VIm)_2$ | 35(1) | Sparks | Sparks | yellow |
| ZIF-8 | — | — | — | — |
| $Zn(EtIm)_2$[e] | — | — | — | — |
| HAlm | 34(4) | >100 | 7 | red |
| HVIm | 35(1) | Sparks | Sparks | red |

[a]each test was conducted in triplicate;
[b]approximate value;
[c]made mechanochemically;
[d]made from solution;
[e]RHO-topology framework.

Figure 3A:
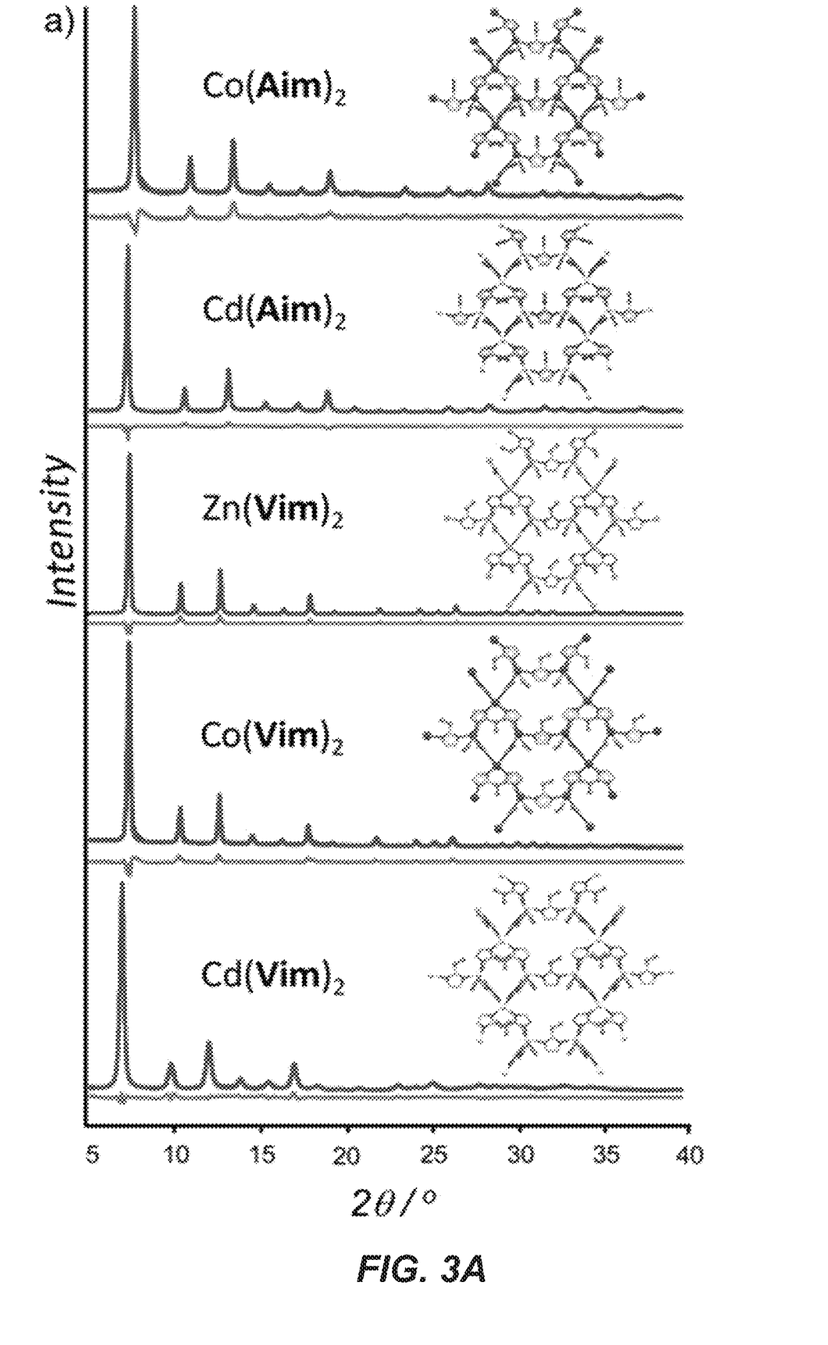
FIG. 3A shows Final Rietveld fits for (top to bottom): $Co(AIm)_2$, $Cd(AIm)_2$, $Zn(VIm)_2$, $Co(VIm)_2$ and $Cd(VIm)_2$.
Figure 3B:
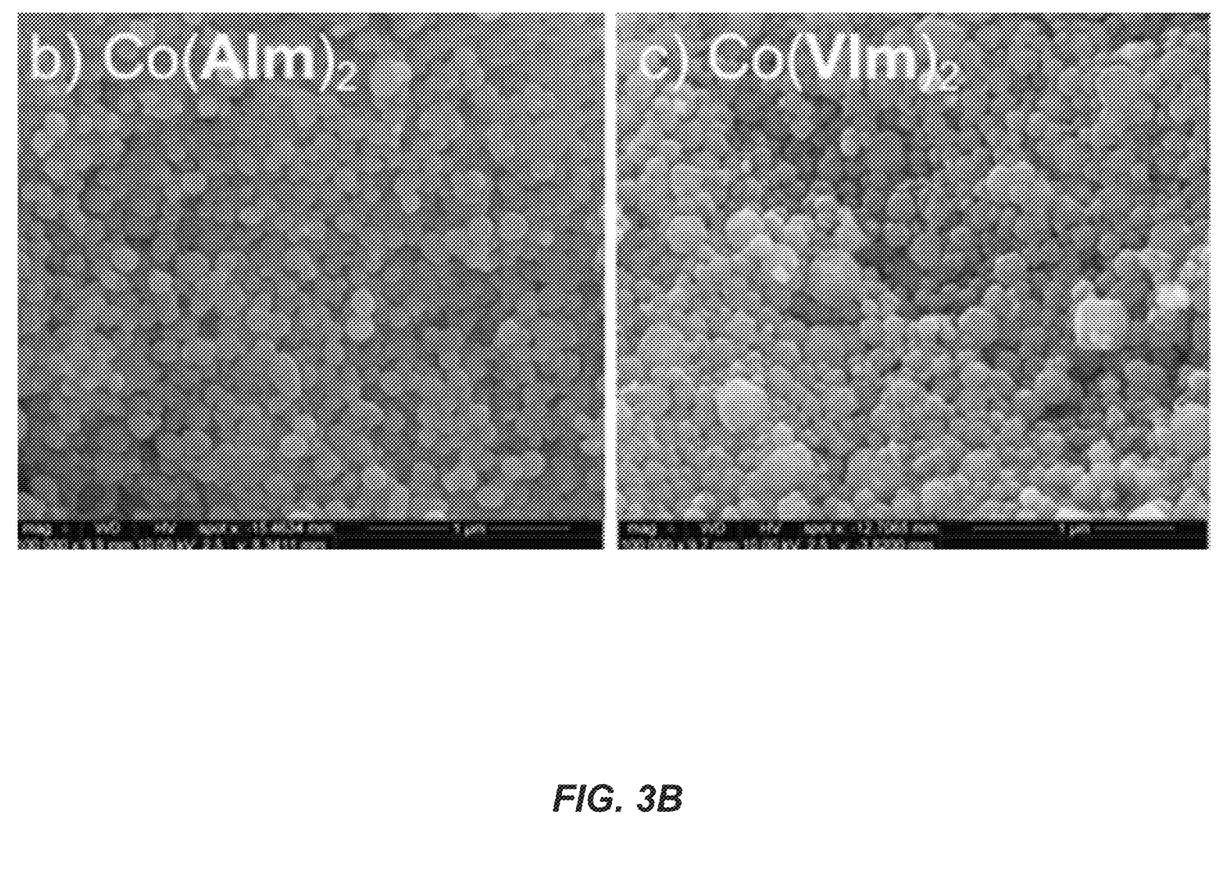
FIG. 3B shows examples of scanning electron microscopy (SEM) images for: (c) $Co(AIm)_2$ and (d) $Co(VIm)_2$.

Next, it was investigated how changes in ligand structure, as well as Lewis acidity and electronic structure of the node can be used to control ZIF hypergolicity. For this purpose, WFNA and RFNA drop tests were synthesized and conducted on acetylene-substituted ZIFs based on $Cd^{2+}$ and $Co^{2+}$ nodes, as well as $Zn^{2+}$, $Co^{2+}$, and $Cd^{2+}$ ZIFs involving a vinyl-substituted imidazole ligand (HVIm). ZIFs were prepared via a range of techniques, including mechanochemistry, aging, and solvothermal routes (see ESI), and PXRD indicated they were all isostructural to $Zn(Alm)_2$. After washing with MeOH and evacuation, TGA in air was consistent with compositions $Co(Alm)_2$, $Cd(Alm)_2$, $Zn(VIm)_2$ (CSD GAZBOB), $Co(VIm)_2$, and $Cd(VIm)_2$ (see ESI). Structures for all ZIFs, after washing with MeOH and evacuation, were confirmed by Rietveld refinement (FIG. 3A).

Acetylene-substituted ZIFs exhibited shorter IDs and more vigorous combustion compared to vinyl-based ones (FIG. 2, Table 1). The vinyl- and acetylene-substituted ZIFs exhibited comparable particle sizes. The choice of metal also had significant effect on ZIF behavior. Hypergolic behavior of $Cd(Alm)_2$ and $Cd(VIm)_2$ was poorer compared to analogous zinc systems. In contrast, $Co^{2+}$ led to hypergolic properties comparable or superior to those of zinc ZIFs: the ID for $Co(Alm)_2$ is comparable to $Zn(Alm)_2$, while $Co(VIm)_2$ is the only vinyl-substituted MOF that underwent full ignition.

Drop tests on $Zn(Alm)_2$, $Co(Alm)_2$ and $Cd(Alm)_2$ were also repeated after one month of storage in a closed vial, revealing high hypergolicity and a short ID of 4(1) ms for $Zn(Alm)_2$, and partially diminished activity for $Co(Alm)_2$, with an ID of 54(5) ms. Hypergolicity of $Cd(Alm)_2$ dropped significantly upon storage, producing only sparks in drop tests. The retention of high hypergolic activity upon storage, as evident with $Zn(Alm)_2$, is an important factor for applications of such materials as solid fuels.

The hypergolicity of the herein reported six isostructural MOFs in drop test involving RFNA was explored, a widely used oxidizer in liquid and solid rocket propulsion systems. With RFNA, hypergolic behavior was observed for all acetylene-substituted MOFs, as well as for $Co(VIm)_2$. No ignition was observed for other vinyl-based MOFs, or pure ligands as the oxidizer. Combined thermogravimetric (TG) and differential scanning calorimetry (DSC) revealed high thermal stability in air for all materials, with exothermic thermal degradation taking place above 200° C. Thermal degradation of $Zn(Alm)_2$, $Co(Alm)_2$ and $Cd(Alm)_2$ was explosive and TG analysis had to be limited to samples of 10 mg or less. No such effect was observed for $Zn(Alm)_2$, $Co(Alm)_2$ and $Cd(Alm)_2$ (see ESI).

Besides hypergolicity, further important characteristics of a propellant are the energy released in the oxidation process, and the energy density of the material. A preliminary theoretical evaluation of these parameters for herein synthesized hypergolic MOFs by using periodic density functional theory (DFT) was conducted. By using DFT, calculated enthalpies ($\Delta Hc$) for reactions of $Zn(AIm)_2$, $Co(AIm)_2$, $Cd(AIm)_2$, $Zn(VIm)_2$, $Co(VIm)_2$ and $Cd(VIm)_2$ solids with $O_2$ gas to produce solid ZnO, CdO, and $Co_3O_4$, along with gases $CO_2$, $N_2$, and water vapor were evaluated. The gravimetric ($E_g$) and volumetric ($E_v$) energy densities were computed from $\Delta H_c$, taking into account the theoretical volume and mass of liquid $O_2$ required for ZIF oxidation.

All oxidation reactions were calculated to be highly exothermic, with $\Delta H_c$ ranging from 3,900 kJ mol$^{-1}$ to 4,800 kJ mol$^{-1}$ (Table 1)

TABLE 2

Calculated combustion enthalpy $\Delta H_c$, gravimetric ($E_g$) and volumetric ($E_V$) energy density, and crystallographic unit cell parameter (a) for ZIFs.

| ZIF | $\Delta H_c$/kJ mol$^{-1}$ | $E_g$/kJ g$^{-1}$ | $E_V$/kJ cm$^{-3}$ | a/Å |
|---|---|---|---|---|
| $Zn(AIm)_2$ | −4783.8 | 7.58 | 8.18 | 17.045(1) |
| $Co(AIm)_2$ | −4760.0 | 7.55 | 7.95 | 16.960(2) |
| $Cd(AIm)_2$ | −4799.9 | 7.08 | 7.54 | 17.9721(9) |
| $Zn(VIm)_2$ | −4789.9 | 7.18 | 7.70 | 17.269(1)[a] |
| $Co(VIm)_2$ | −4767.6 | 7.16 | 7.51 | 17.296(1) |
| $Cd(VIm)_2$ | −4808.4 | 6.73 | 7.18 | 18.234(2) |

[a] from CSD structure GAZBOB;

In order to evaluate the accuracy of the calculations, the $\Delta H_c$ for ZIF-8 (−3916.0 kJ mol$^{-1}$) was calculated and compared to the experimental value measured by bomb calorimetry on bulk material (−4654.0 kJ mol$^{-1}$). The comparison suggests that calculated values are reasonably accurate and most likely underestimate true values by ca. 15%. The $\Delta H_c$ for of vinyl- and acetylene-substituted ZIFs were similar to that of ZIF-8, suggesting that observed differences in hypergolicity are largely due to kinetic effects associated with metal or ligand choice, rather than energetic content of the trigger groups. The calculated $E_g$ and $E_v$ for vinyl-substituted ZIFs are lower than acetylene-based analogues, reflecting the consistently higher crystallographic unit cell dimensions for the former. The calculated $E_g$ and $E_v$ for hypergolic ZIFs ranged from 6.7-7.6 kJ g$^{-1}$ and from 7.2 kJ-8.2 kJ cm$^{-3}$, respectively, which is on par with popular energetic materials (e.g. TNT, 4.56 kJ/g) but still lower than for hydrazine fuels (19.5 kJ g$^{-1}$, 19.3 kJ cm$^{-3}$).

In summary, the first design for MOFs as hypergolic material was reported, based on introducing trigger unsaturated acetylene and vinyl functionalities onto the well-known zeolitic imidazolate framework scaffold. This design is intrinsically different from approaches to synthesize energetic (e.g., explosive, pyrotechnic) MOFs, which are based on using energetic (often nitrogen-rich or nitro-substituted) molecules as MOF components or guests. In contrast, the design of MOF hypergols does not necessitate energetic components as ligands, but presence of substituents that induce ignition. As a result, the presented materials exhibit calculated combustion enthalpies comparable to that of the popular, non-energetic ZIF-8 framework. In contrast to design of explosive MOFs, where formation of a coordination framework increases the stability of an energetic ligand, the herein presented design shows that metal coordination generally enhances ligand hypergolic behavior. As a result, the presented design offers two routes to vary hypergolic properties of a material (i.e., ignition delay, flame color and duration): by choice of the metal node (Co, Zn, Cd) or choice of trigger functionality, with acetylene triggers leading to extremely short ignition delays of 2 ms.

Exemplary Study 2:

The following provides non-limitative examples of combustible compositions comprising a hypergolic metal organic framework, a combustible substance, and/or an additive as described in the present disclosure.

Compositions with Aluminum (Al) Powder as the Combustible Substance

Compositions with Aluminum

Mixtures of hypergolic metal-organic frameworks and aluminum powder were prepared by carefully weighing out the powders and mixing them together briefly in a mortar and pestle. Their hypergolicity was tested using drop tests with WFNA. A mixture of $Co(AIm)_2$ and aluminum in 80 wt % and 20 wt % concentrations respectively, was found to ignite upon contact with WFNA with an ignition delay of 1(1) ms. The resulting flame (Figure X1) was observed to be orange-red in colour and lasted for greater than 250 ms. Similar results were observed when $Co(AIm)_2$ was replaced with $Co(VIm)_2$, except the latter showed an ignition delay of 6(1) ms and a weaker flame. It is interesting to note that $Co(VIm)_2$ alone has a longer ignition delay of 11(1) ms. The results of these ignition tests are summarized in Table 3, as follows:

TABLE 3

Results of ignition delay tests on compositions consisting of hypergolic metal organic frameworks $Co(AIm)_2$ or $Co(VIm)_2$ and aluminum powder.

| Material | ID | Height | Duration | Observations |
|---|---|---|---|---|
| 80 wt % Al, 20 wt % $Co(AIm)_2$ | 1(1) | 4 cm | >250 ms Several ignition | Black residue Orange-red flame |
| 60 wt % Al, 20 wt % AN, 20 wt % $Co(AIm)_2$ | 1(0) | 3-4 cm | >250 ms | Black residue Orange-red flame |
| 80 wt % Al, 20 wt % $Co(VIm)_2$ | 6(1) | 0.5-1 cm | >100 ms Weak flames | Black residue Orange-red flame |
| 60 wt % Al, 20 wt % AN, 20 wt % $Co(VIm)_2$ | 6(2) | 0.5-1 cm | >100 ms | Black residue Orange-red flame |

Compositions with Aluminum and Ammonium Nitrate as the Additive

Figure 4:
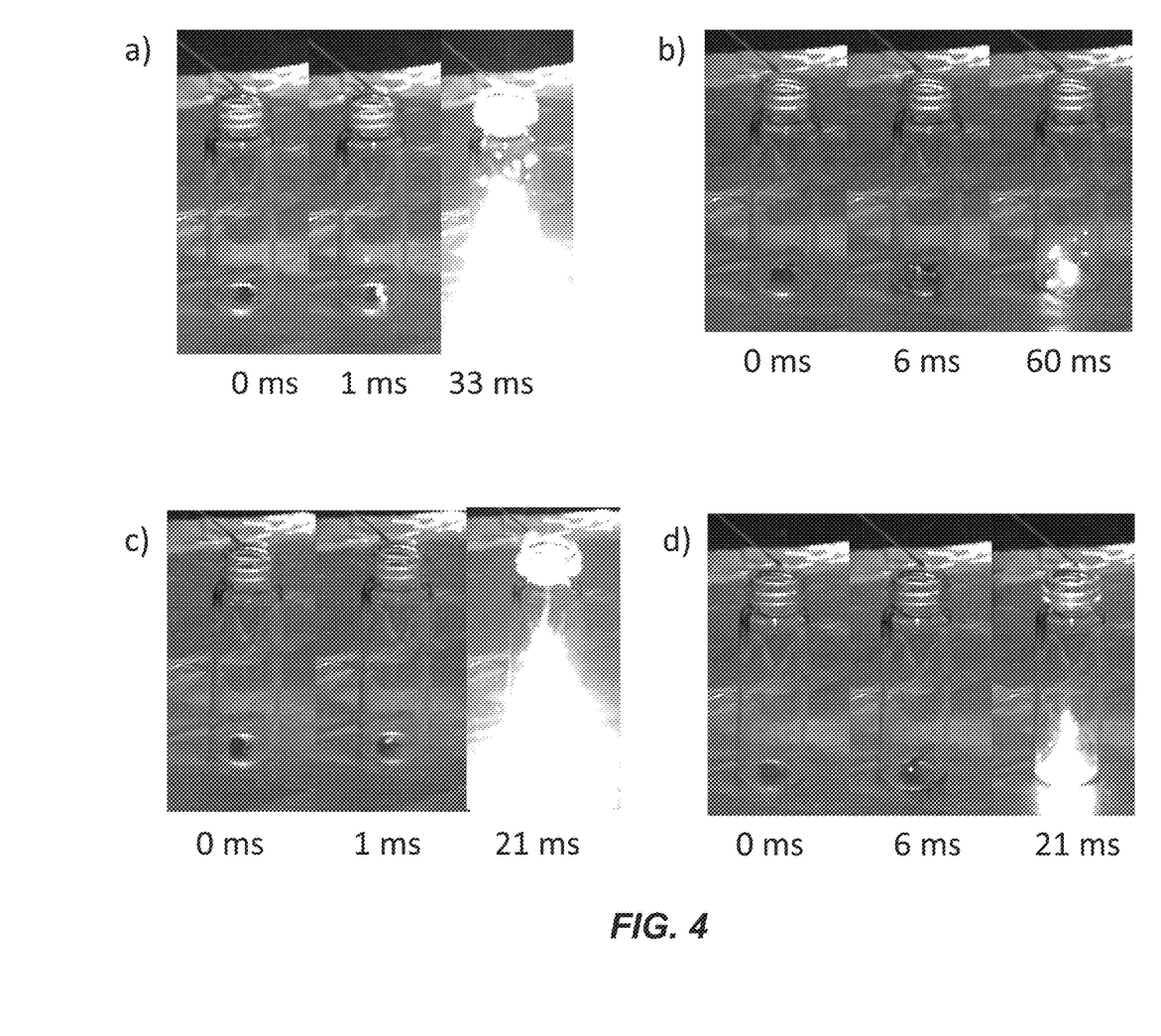
FIG. 4 shows ignition delay test images for: a. a mixture of $Co(AIm)_2$ and aluminum powder in 80 wt % and 20 wt % concentrations; b. a mixture of $Co(VIm)_2$ and aluminum powder in 80 wt % and 20 wt % concentrations; c. a mixture of $Co(AIm)_2$, aluminum powder, and ammonium nitrate in 60 wt %, 20 wt %, and 20 wt % concentrations; d. a mixture of $Co(VIm)_2$, aluminum powder, and ammonium nitrate in 60 wt %, 20 wt %, and 20 wt % concentrations.

Next the effect of adding ammonium nitrate as an additive was evaluated by performing ignition tests on mixtures of hypergolic metal-organic frameworks, aluminum powder, and ammonium nitrate in concentrations of 60 wt %, 20 wt %, and 20 wt % respectively. The addition of the additive did not significantly affect the ignition delay of the hypergolic MOF/aluminum compositions, but the flames were slightly longer lived (FIG. 4). These results are also summarized in Table 3.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

1. Sikder, A. K.; Sikder, N. *J. Hazard. Mater* 2004, A112, 1.
2. Sabatini, Jesse J., and Oyler, K. D. *Crystals* 2015, 6, 5.
3. Zhang, C.; Sun, C.; Hu, B.; Yu, C.; Lu M. *Science* 2017, 355, 374.
4. Xu, Y.; Wang, Q.; Shen, C.; Lin, Q.; Wang P.; Lu M. *Nature,* 2017, 549, 78.
5. Bushuyev, O. S.; Brown, P.; Maiti, A.; Gee, R. H.; Peterson, G. R.; Weeks, B. L.; Hope-Weeks, L. J. *J. Am. Chem. Soc.* 2012, 134, 1422.
6. Smiglak, M.; Metlen, A.; Rogers, R. D. *Acc. Chem. Res.* 2007, 40, 1182.
7. Xu, J.-G.; Wang, S.-H.; Zhang, M.-J.; Sun, C.; Xiao, Y.; Li, R.; Zheng, F.-K.; Guo, G.-C. Huang, J.-S. *ACS Omega* 2017, 2, 346.
8. Mehrkesh, A.; Karunanithi A. T. *ACS Sustainable Chem. Eng.* 2013, 1, 448.
9. Bennion, J. C.; Chowdhury, N.; Kampf, J. W.; Matzger, A. J. *Angew. Chem. Int. Ed* 2016, 55, 13118.
10. Srinivas, D.; Mitchell, L. A.; Parrishc D. A.; Shreeve J. M. *Chem. Commun.,* 2016, 52, 7668.
11. Thottempudi, V.; Forohor, F.; Parrish, D. A.; Shreeve, J. M. *Angew. Chem. Int. Ed* 2012, 51, 9881.
12. Schneider, S.; Hawkins, T.; Rosander, M.; Vaghjiani, G.; Chambreau S.; Drake G. *Energy Fuels,* 2008, 22, 2871.
13. Liu, T.; Qi; Huang, S.; Jiang, L.; Li, J.; Tang, C.; Zhang Q. *Chem. Commun.,* 2016, 52, 2031.
14. Zhang, X.; Shen, L.; Luo, Y.; Jiang, R.; Sun, H.; Liu, J.; Fang, T.; Fan, H.; Liu, Z. *Ind. Eng. Chem. Res.* 2017, 56, 2883.
15. *Chemical rocket propulsion: A comprehensive survey of energetic materials.* De Luca, L. T.; Shimada, T.; Sinditskii, V. P.; Calabro M., eds., Springer. 2016.
16. Tan, H.; Terashima, H.; Koshi, M.; Daimon, Y. *Proceedings of the Combustion Institute* 2015, 35, 2199.
17. McCrary, P. D.; Chatel, G.; Alaniz, S. A.; Cojocaru, O. A.; Beasley, P. A.; Flores, L. A.; Kelley, S. P.; Barber, P. S.; Rogers R. D. *Energy & Fuels* 2014, 28, 3460.
18. Zhang, Y.; Gao, H.; Joo, Y.-H.; Shreeve J. M. *Angew. Chem. Int. Ed.* 2011, 50, 9554.
19. Li, S.; Gao, H.; Shreeve, J. M. Angew. Chem. Int. Ed. 2014, 53, 2969.
20. Eddaoudi, M.; Moler, D. B.; Li, H.; Chen, B.; Reineke, T. M.; O'Keeffe, M.; Yaghi, O. M. *Acc. Chem. Res.* 2001, 34, 319.
21. Fracaroli, A. M.; Siman, P.; Nagib, D. A.; Suzuki, M.; Furukawa, H.; Toste, F. D.; Yaghi, O. M. *J. Am. Chem. Soc.* 2016, 138, 8352.
22. Alkordi, M. H.; Belmabkhout, Y.; Cairns A.; Eddaoudi M. *IUCrJ* 2017, 4, 131.
23. Jiang, J.; Furukawa, H.; Zhang, Y.-B.; Yaghi, O. M. *J. Am. Chem. Soc.* 2016, 138, 10244.
24. Xue, D.-X.; Cairns, A. J.; Belmabkhout, Y.; Wojtas, L.; Liu, Y.; Alkordi, M. H.; Eddaoudi, M. *J. Am. Chem. Soc.* 2013, 135, 7660.
25. Ma, L.; Abney, C.; Lin, W. *Chem. Soc. Rev.,* 2009, 38, 1248-1256.
26. McDonald, K. A.; Seth, S.; Matzger, A. *J. Cryst. Growth Des.* 2015, 15, 5963.
27. Zhang, J.; Du, Y.; Dong, K.; Su, H.; Zhang, S.; Li, S.; Pang, S. *Chem. Mater.* 2016, 28, 1472.
28. Zhang, Y.; Zhang, S.; Sun, L.; Yang, Q.; Han, J.; Wei, Q.; Xie, G.; Chen, S.; Gao, S. *Chem. Commun.,* 2017, 53, 3034.
29. Zhang, S.; Yang, Q.; Liu, X.; Qu, X.; Wei, Q.; Xie, G.; Chen, S.; Gao, S. *Coord. Chem. Rev.* 2016, 307, 292.
30. Blair, L. H.; Colakel, A.; Vrcelj, R. M.; Sinclair, I.; Coles, S. *J. Chem. Commun.* 2015, 51, 12185.
31. Friščić, T. *Chem. Soc. Rev.* 2012, 41, 3493.
32. Gune, S. G.; Kulkarni, S. G.; Panda, S. P. *Combustion and Flame,* 1985, 61, 189.
33. Panda, S. P.; Kulkarni, S. G. *Combustion and Flame* 1977, 28, 25.
34. Kulkarni, S. G.; Panda, S. P. *Combustion and Flame* 1980, 39, 123.
35. Durgapal, U. C.; Venugopal, V. K. *AIAA J.* 1974, 12, 1611.
36. Zhang, Q.; Shreeve J. M. *Chem. Rev.* 2014, 114, 10527.
37. Remi, J. C. S.; Remy, T.; Van Hunskerken, V.; van de Perre, S.; Duerinck, T.; Maes, M.; De Vos, D.; Gobechiya, E.; Kirschhock, C. E. A.; Baron, G. V.; Denayer J. F. M. *ChemSusChem* 2011, 4, 1074.
38. Rachiero, G. P.; Titi, H. M.; Rogers, R. D. *Chem. Commun.* 2017, 53, 7736.
39. Sun, Q.; He, H.; Gao, W.-Y.; Aguila, B.; Wojtas, L.; Dai, Z.; Li, J.; Chen, Y.-S.; Xiao, F.-S.; Ma S. *Nat. Commun.* 2016, 7, 13300.
40. Cong, Y.; Zhang, T.; Li, T.; Sun, J.; Wang, X.; Ma, L.; Liang, D.; Lin L. *J. Prop. Power* 2004, 20, 83.
41. Diede, A., US Secretary of Navy, 2004. Reduced toxicity hypergolic bipropellant fuels. U.S. Pat. No. 6,695,938.
42. Clark, S. J.; Segall, M. D.; Pickard, C. J.; Hasnip, P. J.; Probert, M. I. J.; Refson, K.; Payne, M. C. *Z Kristallogr.* 2005, 220, 567.
43. Simpson, R. L.; Urtiew, P. A.; Ornellas, D. L.; Moody, G. L.; Scribner, K. J.; Hoffman D. M. *Propellants, Explosives, Pyrotechnics* 1997, 22, 249.
44. Perez, J. P. L.; McMahon, B. W.; Anderson S. L. *Journal of Propulsion and Power* 2013, 29, 489.
45. McDonald, K. A.; Bennion, J. C.; Leone, A. K.; Matzger, A. *J. Chem. Commun.* 2016, 52, 10862.
46. Seth, S.; McDonald, K. A.; Matzger, A. *J. Inorg. Chem.* 2017, 56, 10151.

What is claimed is:

1. A propellant-generating combustible for producing a hypergolic propellant when combined with the oxidizer, comprising a hypergolic metal organic framework material for producing a hypergol when combined with an oxidizer, comprising a general structure M1-L-M2, wherein L is an organic linker comprising one or more unsaturated substituents, and wherein M1 and M2 are same or different metal cations, wherein M1 and M2 are each selected from: $Co^{2+}$, $Zn^{2+}$ $Cd^{2+}$, $Fe^{2+}$, $Ni^{2+}$ and $Cu^{2+}$, and wherein said organic linker is an azolate linking moiety, and wherein the combustible has an ignition delay equal to or under 50 ms when combined with the oxidizer, resulting in the hypergolic propellant, with the proviso that the azolate linking moiety does not include a tetrazolate.

2. The propellant-generating combustible as defined in claim 1, wherein M1 and M2 are each $Co^{2+}$.

3. The propellant-generating combustible as defined in claim 1, wherein M1 and M2 are each $Zn^{2}+$.

4. The propellant-generating combustible as defined in claim 1, wherein M1 and M2 are each $Cd^{2}+$.

5. The propellant-generating combustible as defined in claim 1, wherein said azolate linking moiety is selected from pyrazolate, imidazolate, 1,2,4-triazolate, 1,2,3-triazolate, tetrazolate or a combination thereof.

6. The propellant-generating combustible as defined in claim 5, wherein said azolate linking moiety is imidazolate.

7. The propellant-generating combustible as defined in claim 6, wherein one of said one or more unsaturated substituents is located at a 2-position of said imidazolate.

8. The propellant-generating combustible as defined in claim 6, wherein a substituent at a 4-position of said imidazolate linking moiety is selected from one of: H, loweralkyl, oxyalkyl, cycloalkyl, aryl, heteroaryl, heterocycloalkyl, aminoalkyl and a halogen.

9. The propellant-generating combustible as defined in claim 6, wherein a substituent at a 5-position of said imidazolate linking moiety is selected from one of: H, loweralkyl, oxyalkyl, cycloalkyl, aryl, heteroaryl, heterocycloalkyl, aminoalkyl and a halogen.

10. The propellant-generating combustible as defined in claim 1, further comprising at least one of an additive and a combustible substance present in pores of said hypergolic metal organic framework material.

11. A method of producing a hypergol comprising:
combining a hypergolic metal organic framework material as defined in claim 1 with an oxidizer, wherein an ignition occurs by combining said hypergolic organic framework material with said oxidizer.

12. The method as defined in claim 11, wherein said oxidizer is at least one of at least one of nitric acid, liquid oxygen and hydrogen peroxide.

13. The method as defined in claim 12, wherein said oxidizer is composed of 70% to 100% by weight of nitric acid.

14. A hypergol comprising:
a hypergolic metal organic framework material for producing a hypergol when combined with an oxidizer, comprising a general structure M1-L-M2, wherein L is an organic linker comprising one or more unsaturated substituents, and wherein M1 and M2 are same or different metal cations, wherein M1 and M2 are each selected from: $Co^{2+}$, $Zn^{2+}Cd^{2+}$, $Fe^{2+}$, $Ni^{2+}$ and $Cu^{2+}$, and wherein said organic linker is an azolate linking moiety;
and the oxidizer, wherein an ignition occurs by combining said hypergolic metal organic framework material with the oxidizer, with the proviso that the azolate linking moiety does not include a tetrazolate.

15. The hypergol as defined in claim 14, wherein said oxidizer is composed of 70% to 100% by weight of nitric acid.

* * * * *